United States Patent [19]

Dozier

[11] Patent Number: 4,609,985
[45] Date of Patent: Sep. 2, 1986

[54] MICROCOMPUTER WITH SEVERABLE ROM

[75] Inventor: Harold W. Dozier, Carrollton, Tex.

[73] Assignee: Thomson Components-Mostek Corporation, Carrollton, Tex.

[21] Appl. No.: 454,799

[22] Filed: Dec. 30, 1982

[51] Int. Cl.[4] ............................................. G06F 13/00
[52] U.S. Cl. .................................... 364/200; 365/94; 365/200
[58] Field of Search ... 364/200 MS File, 900 MS File; 365/189, 200, 94

[56] References Cited

U.S. PATENT DOCUMENTS

| | | |
|---|---|---|
| 4,450,524 | 5/1984 Oberman | 364/200 |
| 4,514,805 | 4/1985 McDonough et al. | 364/200 |
| 4,527,234 | 7/1985 Belley | 364/200 |

Primary Examiner—Eddie P. Chan
Attorney, Agent, or Firm—Roland Plottel

[57] ABSTRACT

A microcomputer has provision for both on-chip ROM (on the same chip as the CPU) and off-chip ROM and which may operate with only on-chip ROM as only off-chip ROM has the hardware capability to disable on-chip ROM permanently, so that chips having defective ROM may be salvaged by being converted to computer chips that use only off-chip ROM.

4 Claims, 3 Drawing Figures

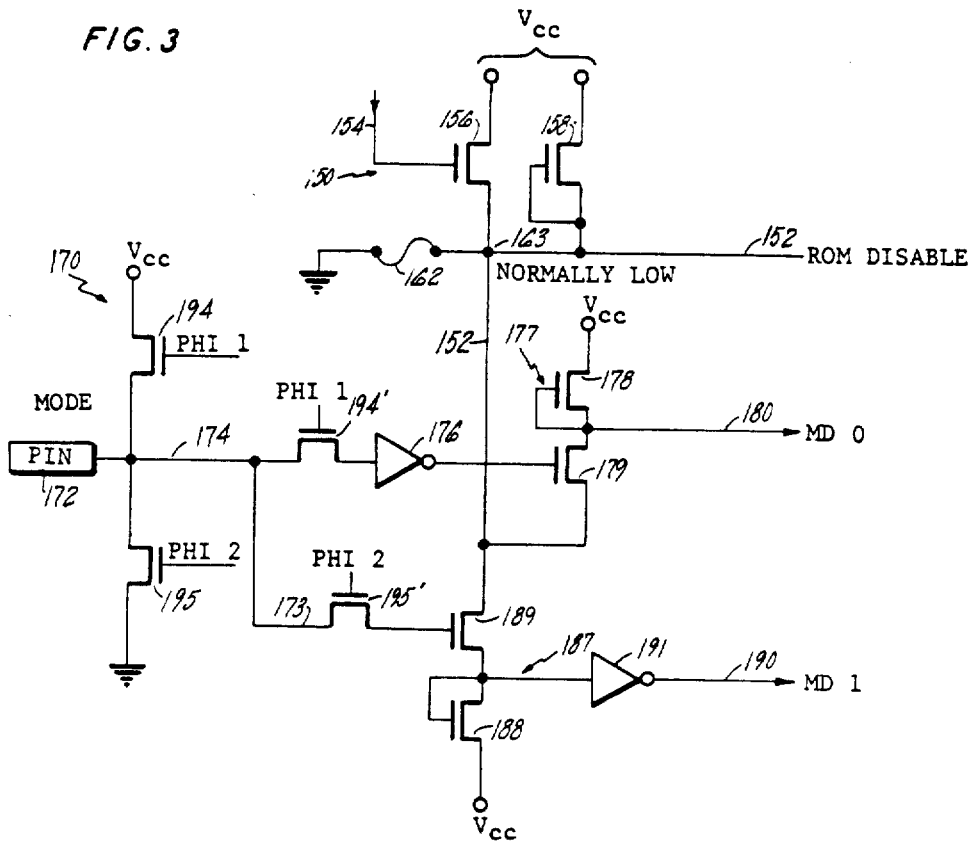

MICROCOMPUTER WITH SEVERABLE ROM

DESCRIPTION

1. Technical Field

The field of the invention is that of a microcomputer with on-chip ROM and the capability to use off-chip memory.

2. Background Art

Microcomputers, as do all computers, need stored programs, the complexity of which may range from library routines to proprietary application programs. These programs are conventionally stored in permanent semiconductor storage ROM chips. A particular class of microcomputers to which the invention applies includes those having ROM that is on the same chip as the CPU, so that the ROM may not be replaced after the chip has been manufactured, as ROM stored on a separate chip could be. Most of these computers fall into the category of single chip computers, the low end in complexity of the integrated circuit computer scale. The more complex computers, in which several chips are needed to form the computer, typically have the ROM on a separate chip so that defective ROM may be replaced simply by replacing the whole chip. In a single chip computer, if the ROM turns out to be defective or if that particular model of chip with its particular set of masks is not wanted, the chips can not be salvaged but must be discarded.

The economics of these semicustom microcomputers, in which the CPU is standard but the stored program is different for each batch, require that the manufacturer make a sizeable batch of chips at once and then ship completed chips as they are ordered by the customer. If the customer cancels his order either because the ROM turns out to have an error or if he simply cannot sell as many chips as he thought he could, then the manufacturer must discard the remaining chips at a loss. It would be financially advantageous if the manufacturer could salvage these otherwise unusable chips.

DISCLOSURE OF INVENTION

The invention relates to a microcomputer with on-chip ROM and also with the capability to use solely off-chip memory, the on-chip ROM having an enabling control circuit that may be permanently set to disable the ROM, so that a microcomputer chip with unwanted on-chip ROM may be salvaged by being converted to a microcomputer chip with no usable on-chip ROM, the function of the ROM being replaced by off-chip memory.

BRIEF DESCRIPTION OF DRAWINGS

FIG. 3 illustrates a component of the circuit of FIG. 1 that enables off-chip ROM.

BEST MODE FOR CARRYING OUT THE INVENTION

The subject invention was made in the course of developing a family of microcomputers for Mostek Corporation of Carrollton, Texas and further information may be found in the publication, "MK68200 Principles of Operation", Version 2.1, dated July 1982 and available from Mostek Corporation, 1215 West Crosby Road, Carrollton, Tex. 75006, which manual is incorporated by reference. Copending applications Ser. No. 454,800 (now abandoned, whose continuation is Ser. No. 783,261, filed Oct. 3, 1985); 471,079, and 471,095 assigned to the assignee thereof and filed on the same date herewith are also incorporated by reference. These copending applications disclose circuits and architecture within the microcomputer CPU which control the routing of memory requests on-chip or off-chip, depending upon whether the system design employs a single-chip version of the computer in which all memory is on-chip or, alternatively, incorporates an expanded version which includes off-chip memory.

Figure 1:
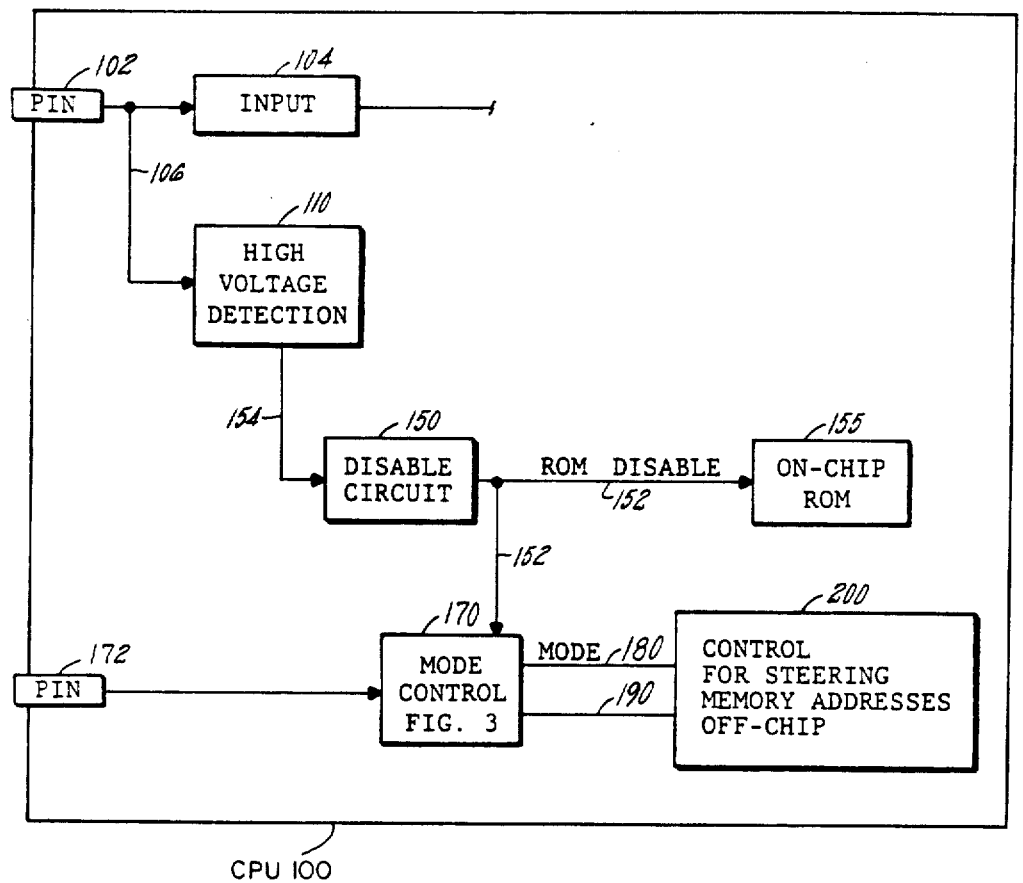
FIG. 1 illustrates a simple circuit diagram of control circuitry implementing the subject invention.

FIG. 1 illustrates a portion of the CPU of a microcomputer constructed according to the invention, in which pin 102 is any convenient pin connected to input circuit 104 which, in turn, passes the input signals on to wherever they may be going. A pin in an output circuit could also be used. Pin 102 also serves the particular function of passing the signal to disable the on-chip ROM. Wire 106 connects to pin 102 and passes to high voltage detection circuit 110 illustrated in FIG. 2 below. The only requirement of input or output unit 104 is that it be sufficiently rugged to stand a relatively high voltage, say 15 volts. High voltage detection unit 110, as will be described below, does not respond to 0 or 5 volt signals on pin 102 but only responds to voltage on pin 102 of greater than 15 volts. Detection unit 110 responds to that high voltage and sends signal on line 154 to circuit 150, labeled disable circuit and shown in FIG. 3 below, which causes a permanent change of state in the unit that permanently disables the ROM. The output of circuit 150 is a ROM disable signal carried on line 152 to on-chip ROM 155 and to mode control 170 which is also shown in FIG. 3. Mode control 170 ordinarily responds to a 0, 5 volt or floating state of pin 172 to determine whether the mode of the microcomputer will be that of single chip microcomputer, a "partial expansion" mode in which there is both on-chip and off-chip ROM, or a "full expansion" mode in which there is no on-chip ROM and only off-chip ROM. In the salvage operation a chip in one of the first two modes is converted to a "full expansion" chip.

Signals which represent one of the three states are carried along mode lines 180 and 190 to unit 200 which performs the function of steering memory addresses off-chip when that is required in the system. The function of detection unit 110 and disable circuit 150 is to force output line 180 and 190 permanently into a state in which ROM requests are always steered off-chip. In the particular embodiment referred to in the above manual, pin 102 serves two functions, while pin 172 is dedicated to mode control. Since there are never enough pins in a microcomputer, the choice of a dedicated pin or a multiplexed pin is one of system design. Different combinations of pins and functions will be applicable to the subject invention.

Figure 2:
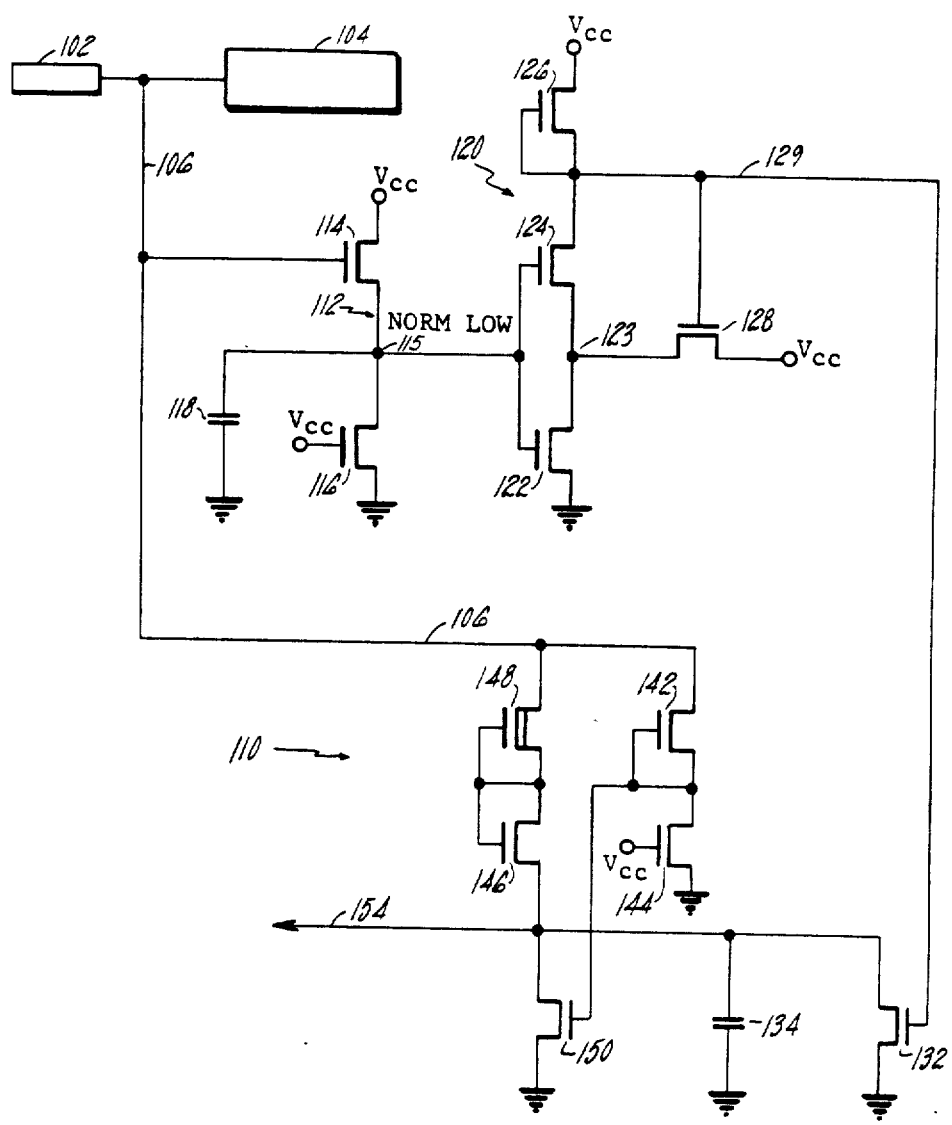
FIG. 2 illustrates a component of the circuit in FIG. 1 that responds to an external signal.

FIG. 2 illustrates high voltage detection unit 110, showing pin 102, input/output unit 104 and line 106, which connects to a voltage divider indicated generally by 112 the function of which is to divide the 15 volt input to a threshold voltage which will pass the threshold of Schmitt trigger 120 and thereby control the output signal on line 154. In the voltage divider, transistor 114 is connected between VCC and node 115 and node 115 is in turn connected through transistor 116 to ground. Voltage on line 106 turns on transistor 114.

Transistor 116 has its gate connected to VCC and is normally on. The current capacities and transconductances of transistors 114 and 116 are sized such, that when line 106 is at 0 volts or 5 volts the voltage on node 115 is below the triggering threshold of Schmitt trigger 120, but is above that threshold for a high voltage. For example, if transistors 114 and 116 are substantially the same, a 5 volt level on line 106 will bring node 115 to a value of about 2.5 volts. Increasing the voltages on line 106 will increase the voltage on node 115 above this value. Also connected to node 115 is Schmitt trigger 120. Schmitt trigger 120 responds to a voltage on node 115 to switch transistors 122 and 124 from their normally off states, since node 115 is normally low, to a conducting state. Line 129, connected between transistor 124 and 126, will then change from its normally high state, maintained by the pull-up function of transistor 126, to a lower state. The threshold of Schmitt trigger 120 is determined by the sizing of transistors 128 and 122, which together set the voltage on node 123, and the threshold of the gate of transistor 124 (connected to node 115) above node 123. When node 115 rises sufficiently in voltage to turn on transistor 124, the voltage on line 129 drops, turning off transistor 128 and effecting the switch.

Line 106 also continues down to the bottom portion of the circuit, the function of which is to provide protection against static discharge from disabling the ROM. There is a danger that static electricity will somehow be applied to pin 102 when the power is off, feeding through the circuit and raising line 154 in voltage and disabling the ROM. When the power is off, transistor 144 is turned off so that voltage on line 106 feeds through transistor 142 to turn on transistor 150, forcing line 154 low and preventing an accidental disablement of the ROM. When the power is on, transistor 144 is held on and transistor 150 is thus held off. In normal operation, inverter transistor 132, which is normally turned on, thus holding output line 154 low, is turned off by Schmitt trigger 129 so that line 154 rises to a high value in response to the high voltage applied to pin 102. The high voltage on pin 106 feeds through depletion transistor 148 and enhancement transistor 146, to raise the voltage on line 154 to the level of the voltage on line 106 minus one threshold drop. Transistor 146 creates a threshold drop that delays the voltage applied to line 154 so that the static protection circuit has time to work.

FIG. 3 illustrates units 150 and 170 of FIG. 1. The blow fuse signal enters on line 154 and turns on transistor 156 connected between VCC and node 163; node 163, in turn, is connected through polysilicon resistor or fuse 162 to ground. Transistor 156 is made sufficiently large in area that its current capacity is greater than the ability of fuse 162 to carry current so that fuse 162 is blown. Line 152, connected from node 163 to ROM 155, is normally held low by fuse 162. After the fuse is blown, line 152 is pulled up by pull-up 158 to VCC. Thus, a permanent DC signal of 5 volts is sent along line 152 to the on-chip ROM 155. Node 163 is also connected to mode control circuit 170, so that the expansion mode may be determined by the voltage on pin 102.

As has been described above, the function of mode control circuit 170 is to respond to one of three states of voltage on pin 172 in order to determine whether the microcomputer will have only on-chip memory, no on-chip memory, or both on-chip and off-chip memory. The voltage on pin 172 goes into line 173 to transistor 189 and also along line 174 where it is inverted by inverter 176 the output of which connects to the gate of transistor 179. Transistor 179 is part of unit 177 which also includes pull-up 178 which controls the voltage on line 180 unless its effect is nullified by transistor 179. If transistor 179 is on, then the voltage on line 180 will reflect the voltage on line 152 to which transistor 179 is connected. When the ROM is not disabled, line 152 is held low, so that pin 172 low forces line 180 low. Similarly, unit 187 consists of pull-up 188 which controls the inverse of the voltage on line 190 unless its effect is nullified by transistor 189. When transistor 189 is on in response to the voltage on line 173 (pin 172 high), then the voltage on line 190 will be the inverse of the voltage on line 152. Since line 152 is normally low, line 190 is high when pin 172 is high. When pin 172 is floating, transistor pairs 194 and 195 force lines 180 and 190 into high and low states, respectively. Transistor 194 is connected between VCC and line 174 and is controlled by one of two nonoverlapping clock signals, PHI 1. When transistors 194 and 194' are on, line 174 is charged to a high voltage, and transistor 179 is therefore turned off, so that line 180 is high. When transistors 194 and 194' are off, inverter 176 is isolated from transistors 195 and 195' by transistor 194'. Inverter 176 has sufficient input capacitance to maintain its state when the input is briefly isolated. Similarly, transistors 195 and 195' control the input of inverter 191 through transistor 189, forcing the input high during the PHI 2 clock and isolating transistor 189 when transistor 195' is off. Again, the capacitance in inverter 191 maintains line 190 low, even when PHI 2 is off. Transistors 194 and 195 are purposely made with a small current capacity, so that they do not disturb an external circuit that forces pin 172 high or low. The effective voltage on lines 180 and 190 in response to various conditions on pin 172 is shown in Table 1, and those skilled in the art will readily observe the operation of the circuit.

TABLE I

| Mode Pad | | MDO | MDI | ROM DISABLE |
|---|---|---|---|---|
| | | \multicolumn{3}{c}{Outputs} | |
| Fuse Intact | 0 | 0 | 0 | 0 |
| | 1 | 1 | 1 | 0 |
| | Float | 1 | 0 | 0 |
| Fuse Blown | 0 | 1 | 0 | 1 |
| | 1 | 1 | 0 | 1 |
| | Float | 1 | 0 | 1 |

In the case where the response to pin 172 is to be overridden and lines 180 and 190 are to be forced into a state in which line 180 is high and line 190 is low regardless of the condition of pin 172, the operation is as follows. In the forcing case, line 152 is high. If pin 172 is high so that inverter 176 produces a low output turning off transistor 179 then pull-up 178 will keep line 180 high, the desired result. If the output of inverter 176 is high, in response to a 0 voltage on pin 172, transistor 179 will be on and the high voltage state of line 152 will pass through transistor 179 and pin 180 will also be high. Similarly for line 190, if transistor 189 is off in response to a low voltage on pin 172, pull-up 188 will bring line 190 low by bringing the input of inverter 191 high. If pin 172 is high, to that transistor 189 is on, the high voltage of line 152 will pass through transistor 189 and the output of inverter 191 will also be low, so that line 190 will remain low for all conditions. If pin 172 is floating, the result of the normal operation of the circuit is the same as the result that is being forced by line 152, so both effects reinforce.

I claim:

1. A single-chip microcomputer comprising:
    a central processing unit (100) having at least two alternative memory access modes;
    input/output means (104) within said central processing unit (100) and connected to at least one external pin (102) thereof; and
    on-chip read-only memory (155) within said central processing unit (100); which microcomputer includes:
    disabling means (150), coupled to said pin (102) and responsive to application of a voltage in excess of 5 volts to said external pin (102) of said microcomputer and having a ROM disable output (152) connected to said on-chip read-only memory (155), to permanently disable said on-chip read-only memory (155), said disabling means including a resistance element (162) of limited current capacity, having first and second terminals, said second terminal being connected to ground and said first terminal being connected to a ROM-disable node (163), said node (163) being connected to a high-current capacity transistor (156) and to said ROM disable output (152), said node (163) being normally held at a predetermined first voltage state by connecting said node (163) to said second, grounded, terminal thereof, whereby said application of a voltage in excess of five volts results in said transistor (156) being gated open and causes said resistance element (162) to be destroyed and said ROM-disable node (163) to change to a second voltage; and
    means (170, 200), connected to said output (152) of said disabling means (150) and to a mode input (172), for accessing external memory.

2. A microcomputer according to claim 1, wherein said at least two modes include
    a single-chip mode in which said central processing unit (100) accesses only said on-chip read-only memory (155) and
    a fully expanded mode in which said on-chip read-only memory (155) is disabled by said disabling means (150), and said central processing unit (100) accesses external memory.

3. a microcomputer according to claim 2, in which said disabling means (150) responds to a high voltage applied to said external pin (102), of said microcomputer, connected over a first connecting line (106) to an input of
    a high voltage detection circuit (110) that applies voltage over a second connecting line (154) to a gate of
    said high-current capacity transistor (156) that, in turn, applies a high current to said first terminal of said resistance element (162).

4. A microcomputer according to claim 3, in which said means (170, 200) for accessing external memory responds to said second voltage on said ROM-disable node (163) in such a manner that any signal on said mode input (172) is rendered ineffective, whereby said memory access mode is forced to one of said at least two modes.

* * * * *